United States Patent
Li et al.

(10) Patent No.: US 11,468,301 B2
(45) Date of Patent: Oct. 11, 2022

(54) METHOD AND APPARATUS FOR PERFORMING OPERATION OF CONVOLUTIONAL LAYER IN CONVOLUTIONAL NEURAL NETWORK

(71) Applicant: Nanjing Horizon Robotics Technology Co., Ltd., Nanjing (CN)

(72) Inventors: Delin Li, Beijing (CN); Kun Ling, Beijing (CN); Liang Chen, Beijing (CN); Jianjun Li, Beijing (CN)

(73) Assignee: Nanjing Horizon Robotics Technology Co., Ltd., Nanjing (CN)

( * ) Notice: Subject to any disclaimer, the term of this patent is extended or adjusted under 35 U.S.C. 154(b) by 961 days.

(21) Appl. No.: 16/203,017

(22) Filed: Nov. 28, 2018

(65) Prior Publication Data

US 2019/0164045 A1    May 30, 2019

(30) Foreign Application Priority Data

Nov. 28, 2017   (CN) .......................... 201711212080.7

(51) Int. Cl.
| | |
|---|---|
| *G06N 3/06* | (2006.01) |
| *G06N 3/063* | (2006.01) |
| *G06N 3/04* | (2006.01) |
| *G06N 20/10* | (2019.01) |

(52) U.S. Cl.
CPC .............. *G06N 3/063* (2013.01); *G06N 3/04* (2013.01); *G06N 3/0454* (2013.01); *G06N 20/10* (2019.01)

(58) Field of Classification Search
None
See application file for complete search history.

(56) References Cited

FOREIGN PATENT DOCUMENTS

WO         03060748 A2    7/2003

OTHER PUBLICATIONS

Du et al., A Reconfigurable Streaming Deep Convolutional Neural Network Accelerator for Internet of Things; https://arxiv.org/abs/1707.02973 ; Jul. 2017 (Year: 2017).*
Aravind Vasudevan et al: "Parallel Multi Channel convolution using General Matrix Multiplication", 2017 IEEE 28th International Conference on Application-Specific Systems, Architectures and Processors (ASAP), Jul. 3, 2017 (Jul. 3, 2017), pp. 19-24, XP055569367, DOI: 10.1109/ASAP.2017.7995254, ISBN: 978-1-5090-4825-0.

(Continued)

*Primary Examiner* — Alan Chen
(74) *Attorney, Agent, or Firm* — Loeb & Loeb LLP (57) ABSTRACT

Disclosed are a method and an apparatus for performing an operation of a convolutional layer in a convolutional neural network. The method includes reading unfolded-feature-data and an original convolution kernel from DRAM, padding the unfolded-feature-data, folding the padded unfolded-feature-data in at least one dimension folded feature data, storing the folded feature data into a SRAM, folding the original convolution kernel in the at least one dimension to generate one or more folded convolution kernels, storing the one or more folded convolution kernels in the SRAM and reading the folded feature data and the one or more folded convolution kernels from the SRAM into a calculation circuit for performing a convolution operation on the folded feature data by using the one or more folded convolution kernels.

20 Claims, 5 Drawing Sheets

(56) References Cited

OTHER PUBLICATIONS

Extended European Search Report for Application No. 18208762.7, dated Apr. 2, 2019, 13 pages.
Qiang Lan et al: "High Performance Implementation of 3D Convolutional Neural Networks on a GPU", Computational Intelligence and Neuroscience, vol. 2017, Nov. 8, 2017 (Nov. 8, 2017), pp. 1-8, XP055568904, US ISSN: 1687-5265, DOI: 10.1155/2017/8348671.
Xiaoming Chen et al: "Optimizing Memory Efficiency for Convolution Kernels on Kepler GPUs", arxiv.org, Cornell University Library, 201 OLIN Library Cornell University Ithaca, NY 14853, May 29, 2017 (May 29, 2017), XP080766540, DOI: 10.1145/3061639.3062297 (6 pages).
Yuan Du et al: "A Streaming Accelerator for Deep Convolutional Neural Networks with Image and Feature Decomposition for Resource-limited System Applications", Sep. 15, 2017 (Sep. 15, 2017), XP055569322, Retrieved from the Internet: URL:https://arxiv.org/ftp/arxiv/papers/1709/1709.05116.pdf [retrieved on Mar. 14, 2019] (5 pages).

* cited by examiner

METHOD AND APPARATUS FOR PERFORMING OPERATION OF CONVOLUTIONAL LAYER IN CONVOLUTIONAL NEURAL NETWORK

TECHNICAL FIELD

The present disclosure relates generally to a technical Held of convolutional neural network, and particularly to a method and an apparatus for performing an operation of a convolutional layer in a convolution neural network.

BACKGROUND

Deep learning technology based on a convolutional neural network has been widely applied to various fields such as image recognition, video analysis, natural language processing, auxiliary driving, and the like. The amount of operations in the convolutional neural network is usually very high. It is expected that the operations in the convolutional neural network can be efficiently performed by hardware such as a universal Central Processor (CPU) and Graphics Processor (GPU) or a dedicated accelerator, and the like.

SUMMARY

In one aspect, disclosed is a method for performing an operation of a convolutional layer in a convolutional neural network. The method may comprise padding unfolded-feature-data (or unfolded feature data) provided to the convolution layer according to a padding mode specified by the convolution layer, folding the padded unfolded-feature-data in at least one dimension of width and height so as to generate folded feature data, folding an original convolution kernel of the convolution layer in the at least one dimension so as to generate one or more folded convolution kernels corresponding to the original convolution kernel, and performing a convolution operation on the folded feature data by using the one or more folded convolution kernels.

In another aspect, disclosed is also an apparatus for performing an operation of a convolutional layer in a convolutional neural network. The apparatus may comprise one or more processors configured to performing the above method.

In another aspect; disclosed is also an apparatus for performing an operation of a convolutional layer in a convolutional neural network. The apparatus may comprise a pre-processing unit configured to pad unfolded-feature-data provided to the convolution layer according to a padding mode specified by the convolution layer, a first folding unit configured to fold the padded unfolded-feature-data in at least one dimension of width and height so as to generate folded feature data, a second folding unit configured to fold an original convolution kernel of the convolution layer in the at least one dimension so as to generate one or more folded convolution kernels corresponding to the original convolution kernel, and an arithmetic unit configured to perform a convolution operation on the folded feature data by using the one or more folded convolution kernels.

In addition, disclosed is also a non-temporary storage medium having program instructions stored thereon for performing the above method when executed by a computing apparatus.

Through the method and/or apparatus according to embodiments of the present disclosure, channel utilization may be improved, buffer footprint may be reduced, and operational efficiency may be improved.

DETAILED DESCRIPTION

A feature data provided to a convolutional neural network may be regarded as a data cube, and may have a plurality of dimensions such as width, height, depth (i.e., different channels), and the like, wherein each data in the feature data may correspond to one point in the data cube, respectively. Accordingly, each convolution kernel of a weight parameter for a convolution operation in a convolutional neural network may also be regarded as a data cube.

Usually, the term "slice" may be adopted for describing a data cube. In a case of considering the three dimensions of a data cube as the dimensions represented respectively by X-axis, Y-axis, and Z-axis in the three-dimensional Cartesian coordinate system, a slice of the data cube in the first dimension corresponding to the dimension represented by the X-axis represents a result obtained by sampling the data in the data cube through using a plane orthogonal to the X-axis, which is a rectangular data on a two-dimensional plane represented by the Y-axis and the Z-axis. Formally, in a ease of regarding a data cube as a set of points, i.e., Cube={(x,y,z)|x∈[0,W), y∈[0,H), x∈[0,D)}, each of W, H, and D being an integer greater than 0, a slice of the data cube in the first dimension corresponding to the dimension represented by the X-axis is $S_i$={(y,z)|x=i, y∈[0,H), x∈[0,D)}, i∈[0,W)}. A slice with each contained data having a value of zero (or a value being equivalent to zero) may be called as a zero slice.

The terra "slice" is also used herein for convenience of descriptions when describing a feature data or a data of a convolution kernel in a certain dimension, for example, a slice in a dimension of width (called herein as "a width slice" for short), a slice in a dimension of height (called herein as "a height slice" for short), and so on.

The term "pixel" could be used when describing a data cube. A pixel of the data cube may include points in the data cube which have the same width (X) and height (Y) coordinates and may be represented as $Pixel_{ij}=\{(z)|x=i, y=j, z\in[0, D)\}$, where $i\in[0, W)$ and $j\in[0, H)$. A slice may include a plurality of pixels.

Padding or appending one or more zero slices in the first dimension (such as a dimension of width) of the data cube A may mean herein increasing a dimension value (such as width) of the first dimension of A by adding one or more zero slices at a certain boundary (for example, on left side or right side in width) in the first dimension of A, wherein each added zero slice has the same dimension values (for example, height value and depth value, respectively) as the original A in the other two dimensions (for example, the two dimensions of height and depth), respectively.

Padding or appending one or more zero slices in both the first dimension and the second dimension (such as both the dimensions of width and height) of the data cube A may meaning herein increasing the dimension value (e.g., width) of the first dimension of A by adding one or more zero slices at a certain boundary (e.g., left or right in width) in the first dimension of A, each added zero slice having the same dimension value (e.g., height value and depth value) as the original A in the other two dimensions (e.g., both the dimension of height and depth), and then adding one or more zero slices at a certain boundary (e.g., the upper side or lower side in height) in the second dimension of a data cube A' obtained after increasing the width so as to add the dimension value (e.g., height) of the second dimension of A', each added zero slice having the same dimension value (e.g., width value and depth value) as the A' in the other two dimensions (e.g., both dimension of width and depth).

Aligning each slice of the data cube A in depth may mean herein padding zero (or a value equivalent to zero) in depth for a slice of A without an expected depth value (which may be either a width slice or a height slice), so that each slice of A after the padding has the expected depth value.

Padding in the first dimension and/or the second dimension of the data cube A means herein that the number of padded zero slices may be zero or one or more, unless otherwise specified.

The operation amount in the convolutional neural network is usually high, and it is expected that operations in a convolutional neural network can be performed efficiently by using hardware such as a universal Central Processor and Graphics Processor or a dedicated accelerator. In order to improve operation efficiency and/or to simplify hardware design, for example, a memory supporting multiple channels may be designed for providing data to the adders and/or multipliers performing the convolution operation, or an arithmetic unit may be designed to support operations on multiple channels.

Usually the number of channels of a feature data provided to an input layer of the convolutional neural network may be small (usually 3 channels or 1 channel), and the number of channels of an input feature data of a convolutional layer near the front in a feed forward inference direction of the convolution neural network may also be small In order to achieve channel alignment, it may be necessary to pad zero slices for the feature data and the corresponding convolution kernels in dimension of depth or channel, resulting in a waste of hardware resources such as caches and/or multipliers, and may involve many invalid operations.

Figure 1:
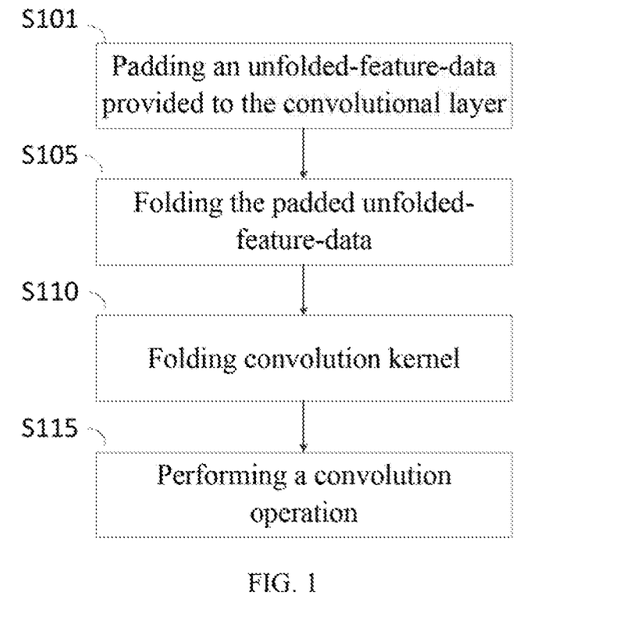
FIG. 1 shows a flow chart of a method for performing an operation of a convolutional layer m a convolutional neural network according to an embodiment of the present disclosure.

FIG. 1 shows an example method 100 for performing an operation of a convolutional layer in a convolutional neural network according to an embodiment of die present disclosure, and the method may include:

step S101, padding unfolded-feature-data provided to the convolutional layer according to a padding mode specified by the convolutional layer;

step S105, folding the padded unfolded-feature-data in at least one dimension of width and height so as to generate folded feature data:

step S110, folding an original convolution kernel of the convolution layer in at least one dimension of width and height so as to generate one or more folded convolution kernels corresponding to the original convolution kernel; and step S115, performing a convolution operation on the folded feature data by using the generated one or more folded convolution kernels.

Through the method according to the embodiment of the present disclosure, at least, the hardware design may be simplified, the utilization of channel or hardware resources may be improved, and/or the parallelism of operations may be improved.

As shown in FIG. 1, an example method 100 for performing an operation of a convolutional layer in a convolutional neural network according to an embodiment of the present disclosure may start from the step S101 for padding unfolded-feature-data provided to the convolutional layer in a padding mode specified by the convolutional layer.

In one convolutional layer of the convolutional neural network, a convolution kernel having the same number of channels (i.e. the same depth) as the original unfolded-feature-data provided to the convolutional layer is designed for the original unfolded-feature-data, the convolution kernel is enabled to slide over the original unfolded-feature-data in a stride of $S_x$ (being greater than or equal to 1) in width and in a stride of $S_y$ (being greater than or equal to 1) in height, and the data of a portion in the original unfolded-feature-data corresponding to the sliding window is convolved so as to obtain an output feature data (or activation value) with the number of channels being 1. A plurality of convolution kernels may be designed for the convolutional layer, these convolution kernels form a weight parameter of the convolutional layer, and a plurality of results obtained by using these convolution kernels correspond to the data on different channels of the output feature data of the convolutional layer, respectively.

In order to be able to correctly perform a convolution operation on the original unfolded-feature-data supplied to the convolutional layer and obtain an output feature data with an expected width and height, before performing convolution, zero slices may be padded around the two dimensions of both width and height (including a starting boundary and an ending boundary in width, and a starting boundary and an ending boundary in height) of the original unfolded-feature-data in a specified padding mode, and the number of padded zero slices depends on the specified padding mode and may be zero, one or more.

For a designed convolutional neural network, the weight parameters (including number of convolution kernels, width, height, depth, and contained value of each convolution kernel) used in each convolutional layer and the padding mode for the original unfolded-feature-data provided to the convolutional layer are always known. These configurations may be specified in advance by a designer of the convolutional neural network when designing the convolutional neural network, and may also be designed or adjusted through learning.

In the example method 100 according to the embodiment of the present disclosure, when an original unfolded input feature data is received at a convolutional layer, the received input feature data is firstly pre-processed in the step S101, i.e. padding the received input feature data according to the padding mode specified by the convolutional layer, including padding zero, one or more zero slices at the starting boundary in width (on the left side) and/or the ending boundary in width (on the right side) and/or the starting boundary in height (on the upper side) and/or the ending boundary in height (on the lower side). In another embodiment, the padding amount on the left side and/or the upper side of the received input feature data (i.e. the number of zero slices to be padded) may also be determined according to a padding mode specified by the convolutional layer, the padding amount on the right side and/or lower side of the received input feature data is then inferred according to the width and/or height of the expected output feature data, the width and/or height of the convolution kernel used for the convolution operation, and the stride of the convolution kernel in width and/or height and a padding is performed correspondingly.

The method 100 then proceeds to the step S105 for folding the padded (pre-processed) unfolded-feature-data in at least one dimension of width and height.

In one embodiment, the padded unfolded-feature-data FD from the step S101 may be folded to generate FD' in one dimension D1 of width and height by splicing each $N_x$ consecutive slices of FD in D1 ($N_x$ being also referred to herein as a splicing number in D1, which may be called as a splicing number for short in a case where the context is clear) together in depth, so that the data of the $(i_{fx} \times N_x + j_{fx})$-th slice of FD in D1 on all $C_x$ channels correspond to the data of the $(i_{fx})$-th slice of FD' in D1 on consecutive $C_x$ channels from the $(j_{fx} \times C_x)$-th channel, wherein $N_x$ is an integer greater than 1, $i_{fx}$ is an integer greater than or equal to 0, $j_{fx}$ is an integer greater than or equal to 0 and less than $N_x$, and $C_x$ is an integer greater than 0.

In another embodiment, after obtaining FD', FD' may be continually folded to generate FD" in another dimension D2 of width and height by splicing each $N_y$ consecutive slices of FD' in D2 ($N_y$ being also referred to herein as a splicing number in D2, which may be called as a splicing number for short in a case where the context is clear) together in depth, so that the data of the $(i_{fy} \times N_y + j_{fy})$-th slice of FD' in D2 on all $C_y$ channels correspond to the data of the $(i_{fy})$-th slice of FD' in D2 on consecutive $C_y$ channels from the $(j_{fy} \times C_y)$-th channel wherein $N_y$ is an integer greater than 1, $i_{fy}$ is an integer greater than or equal to 0, $j_{fy}$ is an integer greater than or equal to 0 and less than $N_y$, and $C_y$ is an integer greater than 0.

Figure 2:
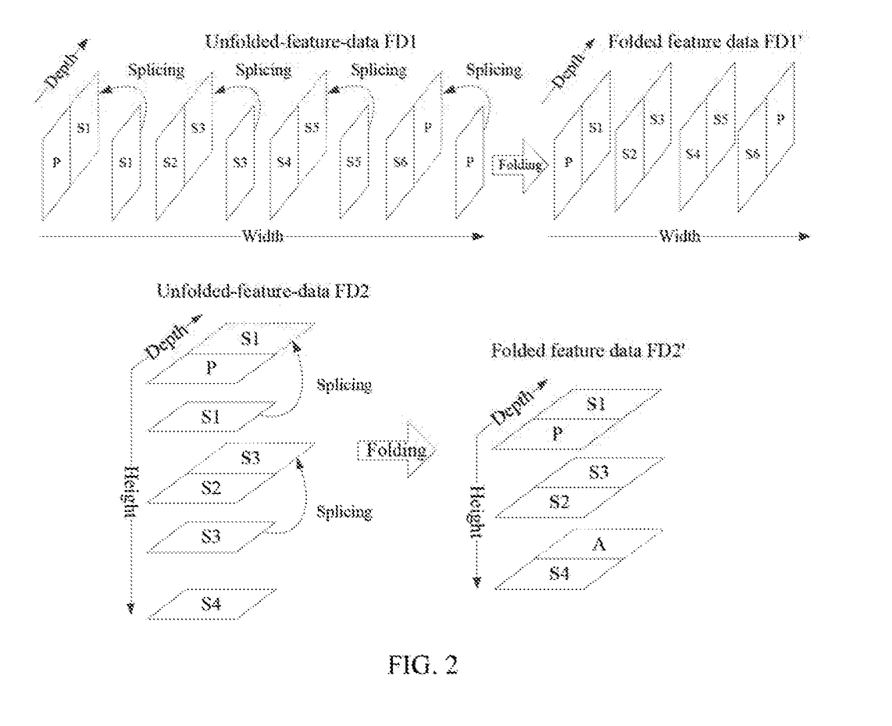
FIG. 2 shows an example of folding unfolded-feature-data according to an embodiment of the present disclosure.

The top half of FIG. 2 shows an example of folding the padded unfolded-feature-data FD1 in width. In this example, the padded unfolded-feature-data FD1 includes original data slices S1 to S6, and includes one zero slice F for padding on the left side and one zero slice P for padding on right side.

As shown in the top half of FIG. 2, through splicing every 2 consecutive slices in width of the padded unfolded-feature-data FD1 (i.e., P on the left side and S1, S2 and S3, S4 and S5, and S6 and P on the right side) together in depth, FD1 may be folded in width and folded feature data FD1' may be generated.

In this example, the width of the folded feature data FD1' becomes half of the width of the padded unfolded-feature-data FD1, and the depth (the number of channels) becomes twice of the depth (the number of channels) of the padded unfolded-feature-data FD1, such that the channel utilization is increased and the amount of computations in the direction of width is reduced.

The lower half of FIG. 2 shows an example of folding the padded unfolded-feature-data FD2 in height. In this example, the padded unfolded-feature-data FD2 includes original data slices S1 to S4 and one zero slice P for padding on the upper side.

As shown in the lower half of FIG. 2, through splicing every 2 consecutive slices in height of the padded unfolded-feature-data FD2 (i.e., P on the upper side and S1, and S2 and S3) together in depth, FD2 may be folded in height and folded feature data FD2' may be generated.

In the example of FIG. 2, the total number of height slice of FD2 is 5, which is not an integer multiple of 2, such that no other slice of the height slices of FD2 can be spliced to the slice S4, resulting in an inconsistence of the number of channels of each height slice of the folded feature data FD2'.

To this end, in one embodiment, the total number of height slices of FD2 may be checked before folding. If the total number is not an integer multiple of the splicing number, one or more zero slices may be firstly appended on the lower side of FD2 (not shown in FIG. 2), such that the total number of the height slices of FD2 becomes an integer multiple of the splicing number. The number of appended zero slices may be smaller than the splicing number, or may be larger than the splicing number as needed, such that the convolutional sliding window is always within the folded feature data for example when performing convolution by using the folded convolution kernel as described below.

In another embodiment, it may be determined during the process of folding for the last slice in the dimension to be folded of the padded (pre-processed) unfolded-feature-data whether it is still necessary to continue splicing in depth based on the slice such that each slice of the obtained folded feature data has the same number of channels. If yes, for example, for such a slice as S4 in FD2, additional one or more zero slices (for example, A in FD2' in FIG. 2) may be continually used for splicing in depth with the slice.

In another embodiment, one or more additional zero slices (for example, A in FD2' in FIG. 2) may be appended to the obtained folded feature data after folding such that the channel of each height slice of the appended folded feature data is aligned.

In another embodiment, the feature or processing capacity of the hardware may be directly used. For example, in a case where hardware may have an ability to align channels, a channel which is not occupied by actual data may be automatically regarded by the hardware as having a zero value. In such a case, the channel of each slice in the folded feature data (for example, FD2' in FIG. 2) may be aligned automatically by hardware.

It will be appreciated that the number of channels of the last width slice in the folded feature data is also possibly inconsistent with the number of channels of other width slices in a case of folding in width. Similarly, the padded unfolded-feature-data or the obtained folded feature data may be processed in width before or during folding or after folding, or processed automatically in width by means of feature of hardware, such that the channel of each width slice in the finally obtained folded feature data is aligned.

In the example of the lower half of FIG. 2, the height of the folded feature data FD2' becomes half of the height of the padded unfolded-feature-data FD2, and the depth (number of channels) becomes twice of the depth (number of channels) of the padded unfolded-feature-data FD2, such that the channel utilization is improved and the amount of operations in the height direction is reduced.

Further, as described above, the folded feature data FD1' may be continually folded in height, or the folding feature data FD2' may be continually folded in width. The difference between the further folding and the initial folding is only that the dimension of the folding and the object of the folding are different, for which the descriptions are therefore omitted herein.

Further, it will be appreciated that the method according to the embodiment of the present disclosure is not limited to the padding mode for the original unfolded-feature-data, the number of width slices or height slices of the original unfolded-feature-data, and the splicing numbers for width folding or height folding.

For example, the splicing number $N_x$ or $N_y$ may be 3, 4, or any other integer greater than 1. In one embodiment, the splicing numbers $N_x$ and/or $N_y$ for width folding or height folding may be configured according to the number of channels supported by the hardware (for example, the memory or arithmetic unit supporting multiple channels). For example, in a case of the number of channels supported by the hardware being TC, the splicing number $N_x$ in the dimension D1 may be determined to be a certain value less than or equal to $\lfloor TC/C_x \rfloor$ and greater than 1, wherein "$\lfloor \ \rfloor$" represents a rounding operation. If it is still necessary to continue folding in dimension D2, the values of $N_x$ and $N_y$ may be selected such that $N_x \times N_y \leq \lfloor TC/C_x \rfloor$ and each value of $N_x$ and $N_y$ is greater than 1.

In the step S110 of the example method 100, the original convolution kernel of the convolution layer is folded in at least one dimension of width and height so as to generate one or more folded convolution kernels corresponding to the original convolution kernel. A weight parameter of the convolutional layer may include one or more convolution kernels, each convolution kernel having the same width and height, and usually the same depth (i.e. the number of channels) as the feature data provided to the layer. Therefore, it will be appreciated that the following descriptions focus on any one of the original convolution kernels of the weight parameter. In other words, if the weight parameter of a convolutional layer includes a plurality of convolution kernels, each convolution kernel may be processed as below.

In one embodiment, if the feature data has been folded in the dimension D1 (one of width and height) in the step S105, one or more transformed convolution kernels $K[k_x]$ corresponding to the original convolution kernel K may be generated in the step S110 by padding $k_x \times S_x$ zero slices at the starting boundary of the original convolution kernel K in D1, wherein $S_z$ is a stride of the original convolution kernel K in D1, and $k_x$ is an integer greater than or equal to 0. For example, three transformed convolution kernels corresponding to the original convolution kernel K may be generated by 0 zero slice, $S_x$ zero slices, and $2 \times S_x$ zero slices, respectively.

A maximum value of $k_x$ may be determined so as to control the number of transformed convolution kernels. For example, $k_x < E_x$ may be determined, wherein $E_x$ may be determined as a result value obtained by dividing a least common multiple of $S_x$ and $N_x$ by $S_x$, or the obtained result value after the $N_x$ is divided by the greatest common divisor of $N_x$ and $S_x$, or $E_x$ may be determined to be equal to $N_x$ in a case where $S_x=1$ or Sx and $N_x$ are coprime. Thus, $E_x$ transformed convolution kernels $K[k_x]$ corresponding to the original convolution kernel K may be generated.

Then, in the step S110, each transformed convolution kernel $K[k_x]$ may be respectively folded in D1 by splicing each $N_x$ consecutive slices in D1 together in depth so as to generate a corresponding folded convolution kernel $C'[k_x]$ for each transformed convolution kernel $K[k_x]$, such that the data of the ($i_{kx} \times N_x + j_{kx}$)-th slice in D1 on all $C_x$ channels of each $K'[k_x]$ correspond to the data of the ($i_{kx}$)-th slice in D1 of $K[k_x]$ on the consecutive $C_x$ channels starting from the ($j_{kx} \times C_x$)-th channel, wherein $i_{kx}$ is an integer greater than or equal to 0, and $j_{kx}$ is an integer greater than or equal to 0 and less than $N_x$.

The generated transformed convolution kernel $K[k_x]$ may have different dimension values in D1 (for example, a width value in a case where D1 is width), or there may be one or more transformed convolution kernels $K[k_x]$ whose dimension value in D1 is not an integer multiple of $N_x$, resulting that the slices of the corresponding $K'[k_x]$ are not aligned in depth.

In one embodiment, a manner similar to padding or appending or adding the feature data before or during or after the folding as described above may be adopted to process similarly the transformed convolution kernel $K[k_x]$ before folding or during or after the folding, such that all of the transformed convolution kernels $K[k_x]$ have the same dimension values in D1 and all of the slices of the folded convolution kernel $K'[k_x]$ are aligned in depth.

In another embodiment, an expected dimension value $EV_x$ in D1 of each transformed convolution kernel $K[k_x]$ may also be determined based on $E_x$, $S_x$, $N_x$, and the dimension values $V_x$ in D1 of the original convolution kernel K. For example, the expected dimension value $EV_x$ in D1 of each transformed convolution kernel $K[k_x]$ may be determined according to the equation $EV_x = \lceil ((E_x-1) \times S_x + V_x)/N_x \rceil \times N_x$, wherein "$\lceil \ \rceil$" means an upward rounding operation. If the dimension value in D1 of the transformed convolution kernel $K[k_x]$ is smaller than $EV_x$, $K[k_x]$ may be adjusted by appending a zero slice at the ending boundary in D1 of the transformed convolution kernel K[kx], such that the dimension value in D1 of the adjusted transformed convolution kernel $K[k_x]$ is equal to $EV_x$, and the adjusted transformed convolution kernel $K[k_x]$ may be then folded in D1 to generate a corresponding folded convolution kernel $K'[k_x]$.

In another embodiment, if the feature data which has been folded by $N_x$ in the dimension D1 is further folded by $N_y$ in the dimension D2 (the other one of width and height) in the step S105, then, in step S110, after obtaining for example $E_x$ folded convolution kernels $K'[k_x]$ ($0 \leq k_x < E_x$), each folded convolution kernel $K'[k_x]$ is folded in D2 in a manner similar to folding K in D1.

For example, one or more transformed convolution kernels $K'[k_x, k_y]$ corresponding to $K'[k_x]$ may be generated by padding $k_y \times S_y$ zero slices at the starting boundary in D2 of the $K'[k_x]$, respectively, wherein $S_y$ is the stride in D2 of the original convolution kernel K, and $k_y$ is an integer greater than or equal to 0. Similarly, the maximum value of $k_y$ may be determined so as to control the number of transformed convolution kernels. For example, $k_y < E_y$ may be determined, wherein $E_y$ may be determined as a result value obtained by dividing the least common multiple of $S_y$ and $N_y$ by $S_y$, or a result value obtained by dividing $N_x$ by the greatest common divisor of $N_y$ and $S_y$, or $E_y$ may be determined to be equal to $N_y$ in a case where $S_y=1$ or $S_y$ and $N_y$ are coprime. Thus, $E_y$ transformed convolution kernels $K'[k_x, k_y]$ corresponding to $K'[k_x]$ or $E_x \times E_y$ transformed convolution kernels $K'[k_x, k_y]$ corresponding to the original convolution kernel K may be generated.

Then, in step S110, each transformed convolution kernel $K'[k_x, k_y]$ may be respectively folded in D2 in a manner of splicing each $N_y$ consecutive slices in D2 together in depth so as to generate a corresponding-folded convolution kernel $K''[k_x,k_y]$ for each transformed convolution kernel $K'[k_x,k_y]$, such that the data of the $(i_{ky} \times N_y+j_{ky})$-th slice in D2 of each $K'[k_x,k_y]$ on all $C_y$ channels correspond to the data of the $(i_{ky})$-th slice in D2 of each $K'[k_x,k_y]$ on consecutive $C_y$ channels starting from the $(j_{ky} \times C_y)$-th channel, wherein $i_{ky}$ is an integer greater than or equal to 0, and $j_{ky}$ is an integer greater than or equal to 0 and less than $N_y$.

Similarly, an expected dimension value $EV_y$ in D2 of each transformed convolution kernel $K'[k_x,k_y]$ may also be determined according to $E_y$, $S_y$, $N_y$, and the dimension value $V_y$ in D2 of the original convolution kernel K. For example, the expected dimension value $EV_y$ in D2 of each transformed convolution kernel $K'[k_x,k_y]$ may be determined according to the equation $EV_y=\lceil((E_y-1) \times S_y+V_y)/N_y\rceil \times N_y$. If the dimension value in D2 of the transformed convolution kernel $K'[k_x,k_y]$ is smaller than $EV_y$, $K'[k_x,k_y]$ may be adjusted by appending zero slices at the ending boundary in D2 of the transformed convolution kernel $K'[k_x,k_y]$, such that the dimension value in D2 of the adjusted transformed convolution kernel $K'[k_x,k_y]$ is equal to $EV_y$, and then the adjusted transformed convolution kernel $K'[k_x,k_y]$ may be folded in D2 to generate a corresponding folded convolution kernel $K''[k_x,k_y]$.

Figure 3:
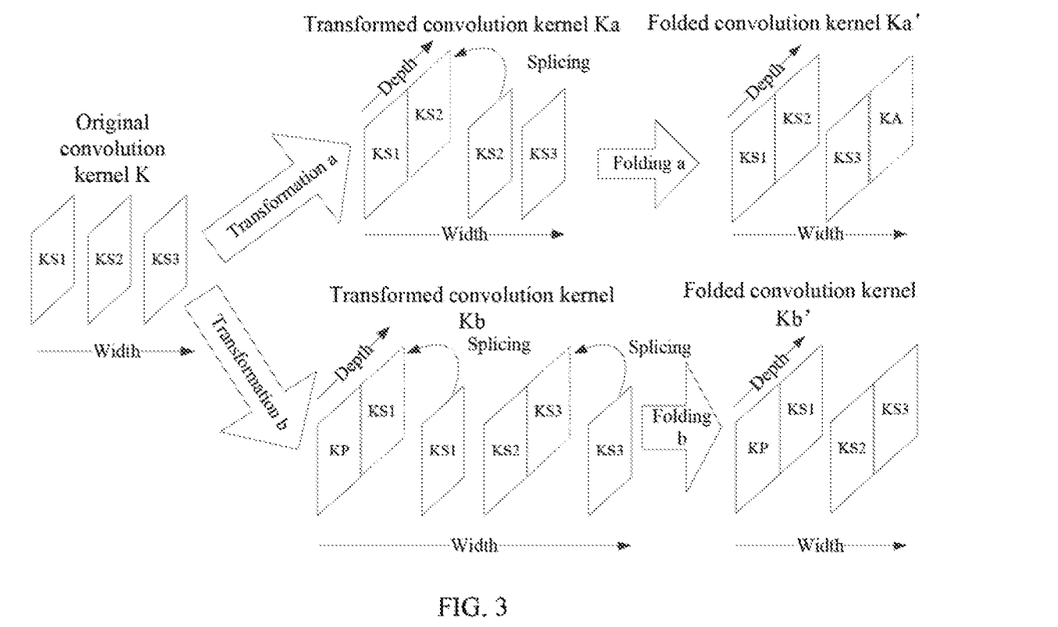
FIG. 3 shows an example of folding an original convolution kernel according to an embodiment of the present disclosure.

FIG. 3 shows an example of folding the original convolution kernel K in width corresponding to the folded feature data FD1' in FIG. 2. In this example, assuming that the width $V_x$ of the original convolution kernel K is 3 (including width, slices KS1 to KS3) and the stride $S_x$ in width is 1, the number of transformed convolution kernels in the dimension of width corresponding to the original convolution kernel K can be determined to be 2. Then, a transformed convolution kernel Ka may be generated by padding or appending 0 zero slice on the left side of the original convolution kernel K, and a transformed convolution kernel Kb may be generated by padding or appending 1 zero slice on the left side of the original convolution kernel K. Then, each of the transformed convolution kernels Ka and Kb is folded in width, and two folded convolution kernels Ka' and Kb' are generated.

As shown In FIG. 3, the width of the transformed convolution kernel Ka is 3, causing each width slice of the folded convolution kernel Ka' misaligned in depth. As described above, each width slice of the folded convolution kernel Ka' may be aligned in depth by supplementing the zero slice KA before folding or during or after the folding, or each width slice of the folded convolution kernel Ka' may be aligned automatically in depth by means of hardware. For example, the expected dimension value or expected width of the transformed, convolution kernels Ka and Kb may be determined to be $\lceil((2-1) \times 1+3)/2\rceil \times 2=4$ before folding, and then one zero slice KA with a width value less than 4 may be padded or appended on the right side of Ka.

FIG. 3 only shows an example of folding the original convolution kernel in width. Folding the original convolution kernel in height, further folding the two folded convolution kernels Ka' and Kb' in height, and folding the original convolution kernel in height and further folding the generated folded convolution kernels in width are similar to the example in FIG. 3 for which the details are omitted herein.

Further, although the step S110 is illustrated after the step S105 in FIG. 1, it will be appreciated that the step S110 may be performed before the step S105 or in parallel with the step S110.

In a case of only folding by $N_x$ in one dimension D1 of width and height, the padded unfolded-feature-data FD may be folded in D1 in the step S105 to obtain folded feature data FD', and the original convolution kernel K is folded in D1 in the step S110 to obtain, for example, $E_x$ folded convolution kernels $K'[k_x]$ ($0 \le k_x < E_x$). Then, the example method 100 proceeds to a step S115, to perform a convolution operation on the folded feature data FD' by using the generated $E_x$ folded convolution kernels $K'[k_x]$.

In such a case, if the value of the stride $S_x$ in D1 of the original convolution kernel K is equal to $N_x$, the stride of each folded convolution kernel $K'[k_x]$ in D1 is 1; otherwise, the stride in D1 of each folded convolution kernel $K'[k_x]$ is $S_x$. Further, the stride in the other dimension D2 of width and height of each folded convolution kernel $K'[k_x]$ is the stride $S_y$ in D2 of the original convolution kernel K.

In a case of further requiring folding in D2 by $N_y$ besides folding in D1, FD' may be continually folded in D2 in step S105 to obtain folded feature data FD'', and $E_x$ folded convolution kernels $K'[k_x]$ are folded in D1 in the step S110 to obtain $E_x \times E_y$ folded convolution kernels $K''[k_x, k_y]$ ($0 \le k_y < E_y$). Then, the example method 100 proceeds to the step S115 for performing a convolution operation on the folded feature data FD'' by using the generated $E_x \times E_y$ folded convolution kernels $K''[k_x, k_y]$.

In such a case, if the value of the snide $S_x$ in D1 of the original convolution kernel K is equal to $N_x$, the stride in D1 of each folded convolution kernel $K''[k_x,k_y]$ is 1; otherwise, the stride in D1 of each folded convolution kernel $K''[k_x, k_y]$ is $S_x$. Further, if the value of the stride $S_y$ in D2 of the original convolution kernel K is equal to $N_y$, the stride in D2 of each folded convolution kernel $K''[k_x,k_y]$ is 1; otherwise, the stride in D2 of each folded convolution kernel $K''[k_x, k_y]$ is $S_y$.

In one embodiment, in the step S115, after performing a convolution on the same portion of the folded feature data by using all of the folded convolution kernel, all of the folded convolution kernels may be moved in D1 or D2 by the stride of the folded convolution kernel in D1 or the stride in D2 so as to perform convolution on another portion of the folded feature data. The final output feature data can be obtained after performing convolutions on all of the portions of the folded feature data.

Figure 4:
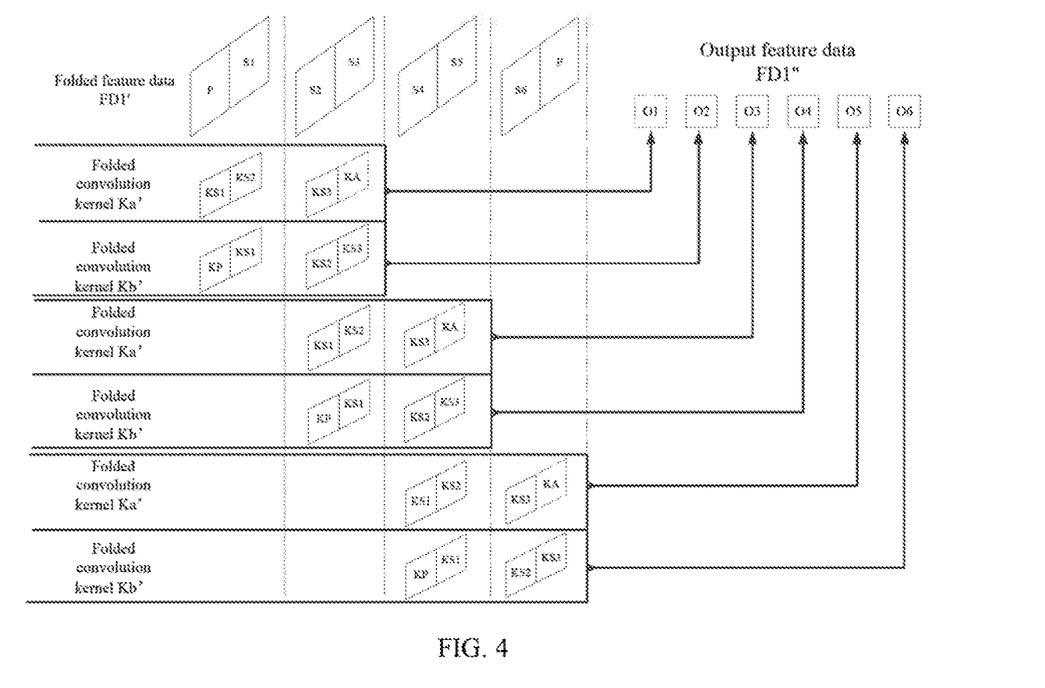
FIG. 4 shows an example of performing a convolution operation on folded feature data by using the folded convolution kernels according to an embodiment of the present disclosure.

For example, as shown in FIG. 4, a convolution may be performed on the P+S1 slice and the S2+S3 slice in the folded feature data FD1' in the example of FIG. 2 by using the folded convolution kernel Ka' in the example of FIG. 3 so as to obtain a partial value O1 in the output feature data FD1'', and a convolution may be performed on the P+S1 slice and the S2+S3 slice in the folded feature data FD1' by using the folded convolution kernel Kb' so as to obtain a partial value O2 in the output feature data FD1''. Then, the folded convolution kernels Ka' and Kb' are moved in width so as to perform a convolution on the S2+S3 slice and the S4+S5 slice in the folded feature data FD1' to obtain partial values O3 and O4 in the output feature data FD1''. Likewise, the partial values O5 and O6 in the output feature data FD1'' are continually obtained.

In another embodiment, convolutions may also be performed on the entire folded feature data by using each folded convolution kernel respectively. In such a case, it may not be necessary to modify the convolution instructions of the hardware. However, if one original convolution kernel corresponds to a plurality of folded convolution kernels, the partial results obtained by using each folded convolution kernel are distributed on different channels. The partial results distributed on different channels may be reorganized or expanded before providing the output feature data to the next layer of the convolutional neural network or taking the output feature data as the final output of the entire convolutional neural network, so as to obtain a complete output result on one channel.

Figure 5:
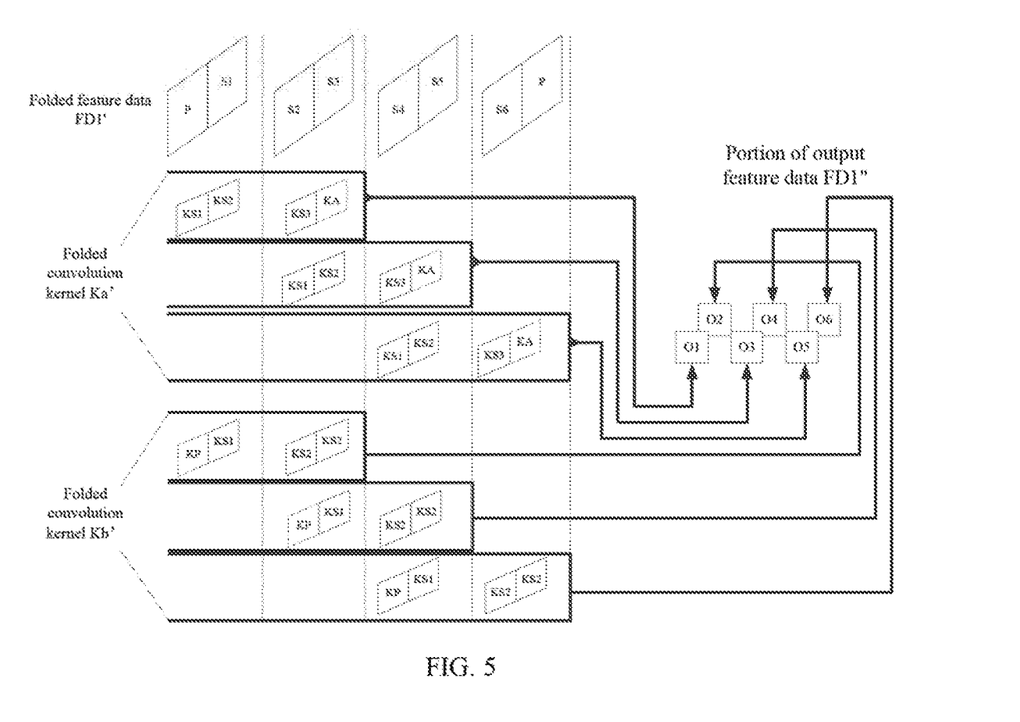
FIG. 5 shows an example of performing a convolution operation on folded feature data by using the folded convolution kernels according to an embodiment of the present disclosure.

For example, as shown in FIG. 5, a convolution may be performed on the entire folded feature data FD1' in the example of FIG. 2 by using the folded convolution kernel Ka' in the example of FIG. 3, and partial values O1, O3 and O5 in the output feature data FD1" are obtained; then, a convolution is performed on the entire folded feature data FD1' by using the folded convolution kernel Kb', and partial values O2, O4 and O6 in the output feature data FD1" are obtained. Then, respective obtained partial values may be organized together to obtain a complete output result FD1".

FIG. 4 and FIG. 5 only show example processes of performing convolutions in width. The process of performing convolution in height is similar, for which the details are omitted herein.

Through folding the feature data and the convolution kernel and performing convolution operations by using the obtained folded feature data and the folded convolution kernel, channel utilization may be improved, buffer footprint may be reduced, and operation efficiency may be improved.

Figure 6:
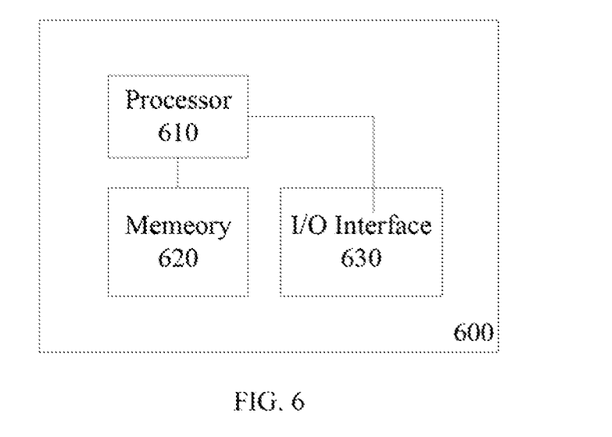
FIG. 6 shows a block diagram of an apparatus for performing an operation of a convolutional layer in a convolutional neural network according to an embodiment of the present disclosure.
Figure 7:
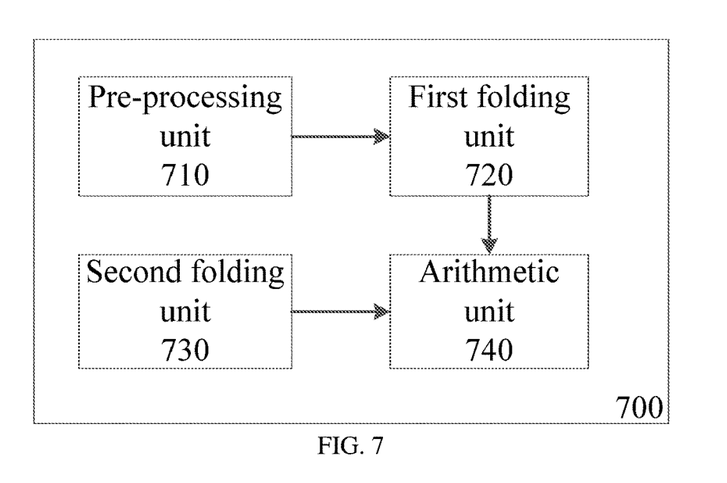
FIG. 7 shows a block diagram of an apparatus for performing an operation of a convolutional layer in a convolutional neural network according to an embodiment of the present disclosure.

For example, in a case where a processing unit (for example, a multiplier array for convolution operation) is capable of processing data with 32 channels at a time, and where a convolution operation is to be performed on an RGB image (the number of channels being 3) of 720×1280 by using a 5×5 convolution kernel (with each stride in width and height being 1), a comparison among the operation amounts of a conventional convolution (i.e. performing the convolution on the original unfolded-feature-data by using the original convolution kernel), a widthwise folding-convolution (i.e. folding the feature data and the original convolution kernel by every 2 slices in width and then performing convolution), and width-height-wise folding convolution (i.e. folding the feature data and the original convolution kernel by every 2 slices in width and height, respectively, and then performing convolution) is as shown in the following Table 1;

FIG. 6 and FIG. 7 show a block diagram of an apparatus for performing an operation of a convolutional layer in a convolutional neural network according to an embodiment of the present disclosure.

As shown in FIG. 6, the example apparatus 600 may include one or more processors 610. The processor 610 may be a processing unit of any form capable of processing data and/or executing instructions, such as a common CPU and GPU or a dedicated processor or accelerator for a neural network. For example, the processor 610 may perform the method according to of the embodiments of the present disclosure to fold the feature data and convolution kernel and perform convolution operations by using the folded feature data and the folded convolution kernel. Further, the processor 610 may also control other components in the apparatus 600 to perform expected functions.

The processor 610 may be connected to a memory 620 and an I/O interface 630 through a bus system and/or a connection mechanism in other forms (not shown).

The memory 620 may include a computer readable and writable storage medium in various forms, for example, a volatile memory and/or a non-volatile memory. The volatile memory may include, for example, a random access memory (RAM) and/or a cache, etc. The non-volatile memory may include, for example, a read only memory (ROM), a hard disk, a flash memory, etc. The readable and writable storage medium may include, but are not limited to, an electric, a magnetic, an optical, an electromagnetic, an infrared, or a semiconductor system, apparatus, or device or any combination of the above. For example, in a case of cooperating with a dedicated processor for the neural network, the memory 620 may also be a RAM on a chip carrying a dedicated processor. The memory 620 may include program instructions for instructing the device 600 to perform the method according to of the embodiments of the present disclosure to fold the feature data and convolution kernel and perform convolution operations by using the folded feature data and the folded convolution kernel.

TABLE 1

| | Multiplication Amount | Operation Formula | Operation Amount Compared with Conventional Convolution | Rate of Effective Operations |
|---|---|---|---|---|
| Conventional convolution | 737280000 | 32 × 720 × 1280 × 5 × 5/1 | 1 | 0.09375 |
| widthwise folding convolution | 442368000 | 32 × 360 × 1280 × 3 × 5/(1/2) | 0.6 | 0.1875 |
| width-height-wise folding convolution | 265420800 | 32 × 360 × 640 × 3 × 3/(1/4) | 0.36 | 0.375 |

The example data in Table 1 shows that the amount of operation may be significantly reduced (for example, the operation amount of the width-height-wise folding convolution is only 36% of the operation amount of the conventional convolution) and the rate of effective operations may be significantly improved (for example, the rate of effective operations of the width-height-wise folding convolution is improved by about 4 times compared with the conventional convolution) through folding the feature data and the convolution kernel and performing convolution operations by using the obtained folded feature data and the folded convolution kernel The I/O interface 630 may be configured to provide parameters or data to the processor 610 and output the result data processed by the processor 610.

As shown in FIG. 7, the example apparatus 700 may include a pre-processing unit 710, a first folding unit 720, a second folding unit 730, and an arithmetic unit 740.

The pre-processing unit 710 may be configured to pad the unfolded-feature-data provided to the convolutional layer according to the padding mode specified by the convolutional layer. In one embodiment, for example, the pre-processing unit 710 may be configured to perform the step S101 in the example method 100 as shown in FIG. 1.

The first folding unit 720 can be configured to fold the padded unfolded-feature-data in at least one dimension of width and height to generate folded feature data. In one embodiment, for example, the first folding unit 720 may be configured to perform the step S105 in the example method 100 as shown in FIG. 1.

The second folding unit 730 may be configured to fold the original convolution kernel of the convolution layer in the at least one dimension to generate one or more folded convolution kernels corresponding to the original convolution kernel. In one embodiment, for example, the second folding unit 710 may be configured to perform the step S110 in the example method 100 as shown in FIG. 1.

The arithmetic unit 740 may be configured to perform a convolution operation on the generated folded feature data by using the generated one or more folded convolution kernels. In one embodiment, for example, the arithmetic unit 740 may be configured to perform the step S115 in the example method 100 as shown in FIG. 1.

It will be appreciated that the apparatus 600 and apparatus 700 shown in FIG. 6 and FIG. 7 are only examples but not limiting. The apparatus according to the embodiment of the present disclosure may include other components and/or structure as needed.

Figure 8:
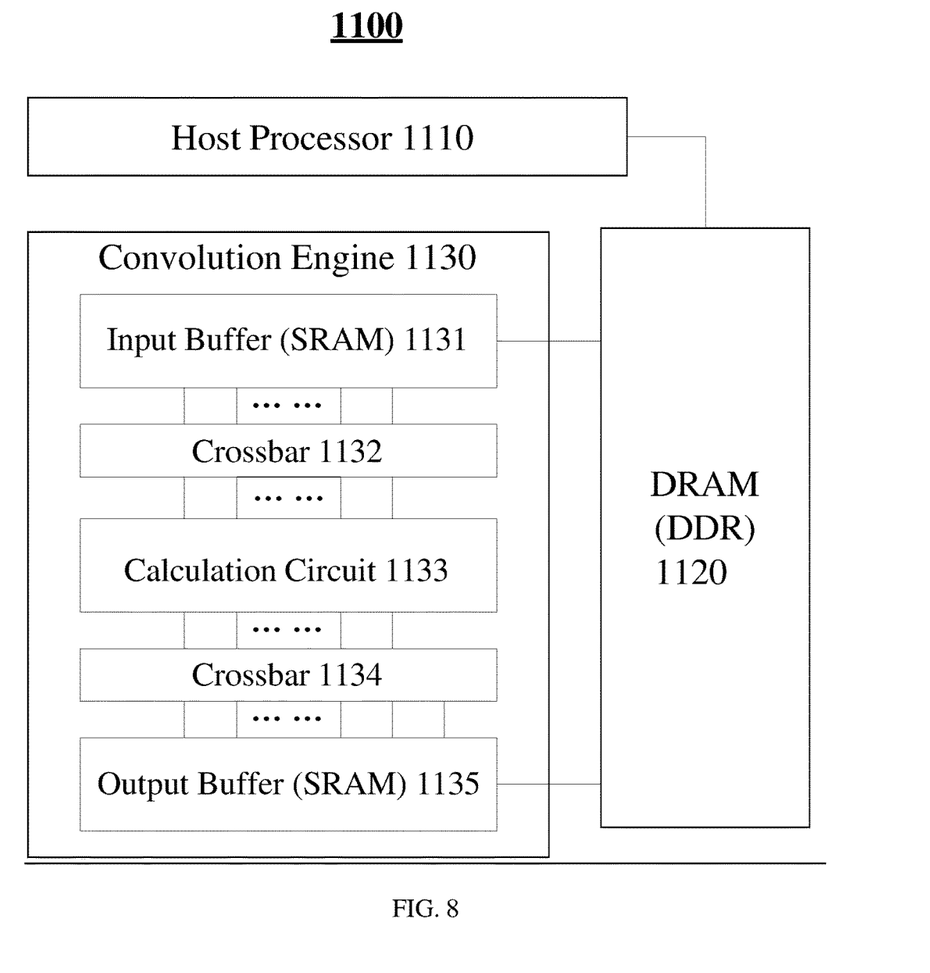
FIG. 8 shows an example of a device for performing a convolution operation on folded feature data according to an embodiment of the present disclosure.

FIG. 8 shows an example of a device for performing a convolution operation on folded feature data according to an embodiment of the present disclosure.

As shown in FIG. 8, the device 1100 may include a host processor 1110, a dynamic random access (DRAM) 1120, and a convolution engine 1130 which may be interconnected with each other via a bus system 1101.

The host processor 1110 may be an ARM processor, a general-purpose Central Processor (CPU), or any other types of processors or controller, and can execute program instructions to control operations of other components in the device 1100 such as the DRAM 1120 and the convolution engine 1130 as described below.

The DRAM 1120 may be a DDR RAM or any other types of DRAMs, and can temporarily store data read from a non-volatile storage such as a magnetic hard disk. For example, the above-mentioned unfolded-feature-data and original convolution kernel for a convolution layer in a convolution neural network or program instructions to be executed by the host processor 1110 may be temporarily stored in the DRAM 1120.

The convolution engine 1130 may read the unfolded-feature-data and the original convolution kernel from the DRAM 1120 to per form any one of the methods disclosed above. The convolution engine 1130 may be formed as a chip, and its components and operations will be discussed below in detail.

The convolution engine 1130 may include an input buffer 1131, which may be a static random access memory (SRAM). The unfolded-feature-data and the original convolution kernel may be read from the DRAM 1120 and stored in the SRAM 1131. The unfolded-feature-data and the original convolution kernel may be stored in either the same SRAM 1131 or separated SRAMs. Before or while being stored in the SRAM 1131, the unfolded-feature-data and the original convolution kernel may be padded and folded as described above with reference to FIGS. 1-3.

In an embodiment, padding, folding and storing of the unfolded-feature-data may be performed in one step. For example, while the unfolded-feature-data read from the DRAM 1120 are being written into the SRAM 1131, additional zero values may be inserted into a data stream of the unfolded-feature-data, and the padded unfolded-feature-data are stored in a predetermined format into the SRAM 1131 so that the feature data stored in the SRAM 1131 have been padded and folded.

Figure 9A:
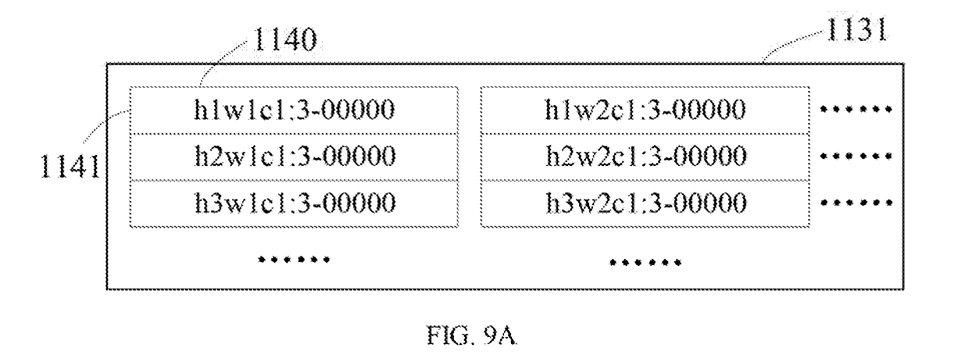
FIGS. 9A and 9B show examples of how the feature data are stored in a static random access memory.
Figure 9B:
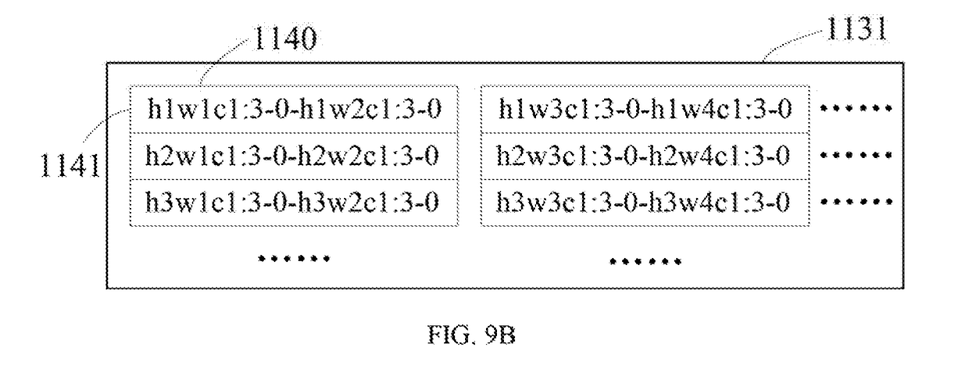

FIGS. 9A and 9B show examples of how the feature data FD1 and FD1' in FIG. 2 are stored in the SRAM 1131, respectively.

As shown in FIG. 9A, the SRAM 1131 may include a plurality of memory units 1141 arranged in plural columns 1140, and each column 1140 may also be called as a "slice". Each memory unit 1141 may include a plurality of memory cells (not shown) for storing a plurality of bits, respectively. For example, each memory unit 1141 may store 8 bits, 16 bits or more. The number of bits stored in each memory unit 1141 is also called as data width. Each memory unit 1141 has an address, and the SRAM slice 1140 is continuously addressed in the column direction. The plurality of memory cells in each memory unit 1141 may be read and written synchronously, and the plurality of SRAM slices 1140 may be read or written synchronously, so that the SRAM 1131 has a data width B*N where B is the data, width of the slice 1140 (or the unit 1141) and N is the number of slices 1140 included in the SRAM 1131.

In a case where each memory unit 1141 has a data width of 64 bits and each pixel of the original feature data FD1 includes 3 channels, each memory unit 1141 can store 8 data while only one pixel (3 data for 3 channels) is stored in each unit 1141, and the remaining 40 (i.e., 64−3*8) bits of the unit 1141 are padded with 5 zero values, as shown in FIG. 9A. However, for the folded feature data FD1', two pixels may be stored in each unit 1141, and at the end of each pixel is padded only one zero value, as shown in FIG. 9B. In another example, instead, two zero values may be padded at the end of the second pixel. It is appreciated that in a case where the memory unit 1141 has a larger data width, more pixels may be stored in each memory unit 1141. By storing two or more pixels in each unit 1141, more data may be supplied in one period to a calculation unit 1133 described below for performing a convolution operation as compared with only one pixel being stored in one unit 1141, thereby improving computation efficiency of the device 1100.

Similarly, the original convolution kernel may be read from the DRAM 1120 and written in the SRAM 1131, and it may be padded and folded as described above to generate one or more folded convolution kernels. Storage of the one or more folded convolution kernels may be similar to that of the folded feature data as described above with reference to FIGS. 9A and 9B, except that they are stored in different SRAM slices 1140. Details of storage of the kernels in the SRAM 1131 will be omitted herein. It is appreciated that as the SRAM 1131 has a capability smaller than the DRAM 1120, it may read only a portion of the feature data and a portion of the kernels at one time.

Referring back to FIG. 8, the folded feature data and the one or more folded convolution kernels may be mad from the SRAM 1131 into a calculation circuit 1133 to perform a convolution operation. The calculation circuit 1133 may include a plurality of multipliers and a plurality of adders for the convolution operation.

In an embodiment, the calculation circuit 1133 may simultaneously calculate products of plural pixels in the folded feature data each with a corresponding pixel of plural folded convolution kernels. By doing so repeatedly, a same portion of the folded feature data may be convolved by all the folded convolution kernels. For example, if the calculation circuit 1133 includes 256 multipliers, it may simultaneously multiply 8 pixels (each having 4 channels, 32 data in total) of the folded feature data each with a corresponding pixel (also having 4 channels) in 8 kernels, generating 64 (8 pixels*8 channels) data. As compared with a conventional case where the feature data is not folded, calculation efficiency is greatly improved.

The calculation results from the calculation circuit 1133 may be stored in an output buffer (SRAM) 1135. The input buffer 1131 and the output buffer 1135 are equipped with a crossbar 1132 and a crossbar 1134, respectively, to facilitate data transform with the calculation circuit 1133. If necessary, the calculation results may also be moved from the output buffer 1135 to the DRAM 1120.

Unless otherwise required clearly in the context, throughout the description and claims, the wordings such as "comprise" and "include" are to be construed in an inclusive sense, as opposed to an exclusive or exhaustive sense, that is to say, in a sense of "including but not limited to". Additionally, when used in the disclosure, the wordings of "herein", "above", "below" and similar wordings shall refer to the disclosure as a whole but not to any specific portion of the disclosure. When being permitted in the context, the wordings in singular or plural used in the above descriptions may also include the plural or singular, respectively. The wording of "or" in reference to a list of two or more items covers all of the following interpretations of the wording; any of the items in the list, all of the items in the list, and any combination of the items in the list.

The above detailed description of the embodiments of the disclosure is not intended to be exhaustive or to limit the disclosure to a specific form disclosed above. Although specific embodiments and examples of the disclosure are described above for illustrative purposes, various equivalent modifications are possible within the scope of the disclosure, as appreciated by those skilled in the art. For example, although the processes or blocks are presented in a given order, alternative embodiments may execute a process including these steps in a different order or employ a system including these blocks in a different order, and some processes or blocks may be deleted, moved, added, subdivided, combined, and/or modified. Each of these processes or blocks may be implemented in a variety of different ways. Further, although the processes or blocks are shown sometimes as being executed in series, these processes or blocks may instead be executed in parallel, or may be executed at different times.

The teachings of the disclosure provided herein may be applied to other systems, but not necessarily the system described above. The elements and acts of the various embodiments described above may be combined to provide further embodiments.

Although some embodiments of the disclosure have been described, these embodiments have been presented by way of example only, but are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure.

What is claimed is:

1. A method for performing an operation of a convolutional layer in a convolutional neural network, comprising:
    reading unfolded-feature-data provided to the convolution layer and an original convolution kernel of the convolution layer from a dynamic random access memory (DRAM);
    padding the unfolded-feature-data according to a padding mode specified by the convolution layer;
    folding the padded unfolded-feature-data in at least one dimension of width and height to generate folded feature data;
    storing the folded feature data into a static random access memory (SRAM);
    folding the original convolution kernel in the at least one dimension of width and height to generate one or more folded convolution kernels corresponding to the original convolution kernel;
    storing the one or more folded convolution kernels in the SRAM; and
    reading the folded feature data and the one or more folded convolution kernels from the SRAM into a calculation circuit for performing a convolution operation on the folded feature data by using the one or more folded convolution kernels.

2. The method of claim 1 wherein the SRAM comprises a plurality of memory units, each memory unit has a memory address, at least every two pixels of the folded feature data are stored in a same memory unit, and at least every two pixels of each folded convolution kernel are stored in a same memory unit.

3. The method of claim 1 wherein the calculation circuit comprises a plurality of multipliers and a plurality of adders.

4. The method of claim 3 wherein the folding the padded unfolded-feature-data in the at least one dimension comprises:
    performing a first folding on the unfolded-feature-data in a first dimension by splicing every $N_x$ consecutive slices in the first dimension together in depth, the first dimension being one of width and height, and $N_x$ being an integer greater than 1.

5. The method of claim 4 wherein data of an $(i_{fx} \times N_x + j_{fx})$-th slice in the first dimension of the padded unfolded-feature-data on all $C_x$ channels correspond to data of an $(i_{fx})$-th slice in the first dimension of a result of the first folding on consecutive $C_x$ channels starting from a $(j_{fx} \times C_x)$-th channel, $i_{fx}$ being an integer greater than or equal to 0, $j_{fx}$ being an integer greater than or equal to 0 and less than $N_x$, and $C_x$ being an integer greater than 0.

6. The method of claim 4 wherein in a case where a first stride in the first dimension of the original convolution kernel is not equal to $N_x$, the performing the convolution operation comprises:
    moving all of the folded convolution kernels corresponding to the original convolution kernel in the first dimension by the first stride after performing a convolution on a same portion of the folded feature data by using all of the folded convolution kernels corresponding to the original convolution kernel, or
    performing a convolution on the folded feature data in whole by using each of the one or more folded convolution kernels, respectively, where each folded convolution kernel has a stride in the first dimension equal to the first stride.

7. The method of claim 6 wherein the performing a convolution on a same portion of the folded feature data comprises:
    simultaneously calculating, by the plurality of multipliers, products of plural pixels in the folded feature data each with a corresponding pixel of plural folded convolution kernels.

8. The method of claim 4 wherein in a case where a first stride in the first dimension of the original convolution kernel is equal to $N_x$, each folded convolution kernel has a stride in the first dimension equal to 1.

9. The method of any one of claim 4 wherein the folding the original convolution kernel in the at least one dimension comprises:

padding $k_x \times S_x$ zero slices at a starting boundary in the first dimension of the original convolution kernel to generate $E_x$ first transformed convolution kernels, respectively, $S_x$ being a first stride in the first dimension of the original convolution kernel, $E_x$ being greater than or equal to 1 and depending on values of $N_x$ and $S_x$, and $k_x$ being an integer greater than or equal to 0 and less than $E_x$; and performing a second folding on each first transformed convolution kernel in the first dimension by splicing every $N_x$ consecutive slices in the first dimension together in depth to generate a corresponding first folded convolution kernel for each first transformed convolution kernel.

10. The method of claim 9 wherein data of an $(i_{kx} \times N_x + j_{kx})$-th slice in the first dimension of each first transformed convolution kernel on all $C_x$ channels correspond to data of an $(i_{kx})$-th slice in the first dimension of each first transformed convolution kernel on consecutive $C_x$ channels starting from a $(j_{kx} \times C_x)$-th channel, respectively, $i_{kx}$ being an integer greater than or equal to 0, and $j_{kx}$ being an integer greater than or equal to 0 and less than $N_x$.

11. The method of claim 9 wherein the folding the original convolution kernel in the at least one dimension further comprises:

using the generated $E_x$ first folded convolution kernels as one or more folded convolution kernels corresponding to the original convolution kernel.

12. The method of claim 9 wherein the folding the padded unfolded-feature-data in the at least one dimension further comprises:

performing a third folding on a result of the first folding in the second dimension by splicing every $N_y$ consecutive slices in the second dimension together in depth, the second dimension being another of width and height, and $N_y$ being an integer greater than 1.

13. The method according to claim 12 wherein data of an $(i_{fy} \times N_y + j_{fy})$-th slice in the second dimension of the result of the first folding on all $C_y$ channels correspond to data of an $(i_{fy})$-th slice in the second dimension of a result of the third folding on consecutive $C_y$ channels starting from a $(j_{fy} \times C_y)$-th channel, $i_{fy}$ being an integer greater than or equal to 0, $j_{fy}$ being an integer greater than or equal to 0 and less than $N_y$, and $C_y$ being an integer greater than 0.

14. The method of claim 12 wherein the folding the original convolution kernel in the at least one dimension further comprises:

padding $k_y \times S_y$ zero slices at a starting boundary in the second dimension of the first folded convolution kernel, respectively, to generate $E_y$ second transformed convolution kernels for each first folded convolution kernel, respectively, $S_y$ being a second stride in the second dimension of the original convolution kernel, $E_y$ being greater than or equal to 1 and depending on values of $N_y$ and $S_y$, and $k_y$ being an integer greater than or equal to 0 and less than $E_y$; and performing a fourth folding on each second transformed convolution kernel in the second dimension by splicing every $N_y$ consecutive slices in the second dimension together in depth to generate a corresponding second folded convolution kernel for each second transformed convolution kernel.

15. The method of claim 14 wherein data of an $(i_{ky} \times N_y + j_{ky})$-th slice in the second dimension of each second transformed convolution kernel on all $C_y$ channels correspond to data of an $(i_{ky})$-th slice in the second dimension of each second transformed convolution kernel on consecutive $C_y$ channels starting from a $(j_{ky} \times C_y)$-th channel, $i_{ky}$ being an integer greater than or equal to 0, and $j_{ky}$ being an integer greater than or equal to 0 and less than $N_y$.

16. The method of claim 14 wherein the folding the original convolution kernel in the at least one dimension further comprises:

using the generated $E_x \times E_y$ second folded convolution kernels as one or more folded convolution kernels corresponding to the original convolution kernel.

17. The method of claim 12 wherein in a case where a second stride in the second dimension of the original convolution kernel is not equal to $N_y$, the performing the convolution operation comprises:

moving all of the folded convolution kernels corresponding to the original convolution kernel in the second dimension by the second stride after performing a convolution on a same portion of the folded feature data by using all of the folded convolution kernel corresponding to the original convolution kernel, or performing a convolution on the folded feature data in whole by using each of the one or more folded convolution kernels, respectively, where a stride of each folded convolution kernel in the second dimension is equal to the second stride.

18. The method of claim 12 wherein in a case where a second stride in the second dimension of the original convolution kernel is equal to $N_y$, a stride in the second dimension of each folded convolution kernel is 1.

19. An apparatus for performing an operation of a convolutional layer in a convolutional neural network, comprising:

one or more processors configured to execute instructions stored in a memory, execution of the instructions causing the one or more processors to perform the method of claim 1.

20. A non-temporary storage medium having program instructions stored thereon for performing a method for performing an operation of a convolutional layer in a convolutional neural network when executed by a computing apparatus, wherein the method comprises:

reading unfolded-feature-data provided to the convolution layer and an original convolution kernel of the convolution layer from a dynamic random access memory (DRAM);

padding the unfolded-feature-data according to a padding mode specified by the convolution layer;

folding the padded unfolded-feature-data in at least one dimension of width and height to generate folded feature data;

storing the folded feature data into a static random access memory (SRAM);

folding the original convolution kernel in the at least one dimension of width and height to generate one or more folded convolution kernels corresponding to the original convolution kernel;

storing the one or more folded convolution kernels in the SRAM; and reading the folded feature data and the one or more folded convolution kernels from the SRAM into a calculation circuit for performing a convolution operation on the folded feature data by using the one or more folded convolution kernels.

* * * * *